(12) United States Patent
Steinhauser et al.

(10) Patent No.: US 7,892,144 B2
(45) Date of Patent: *Feb. 22, 2011

(54) METHOD FOR THE OPERATION OF A DRIVETRAIN

(75) Inventors: Klaus Steinhauser, Kressbronn (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 715 days.

This patent is subject to a terminal disclaimer.

(21) Appl. No.: 11/811,207

(22) Filed: Jun. 7, 2007

(65) Prior Publication Data

US 2007/0287588 A1  Dec. 13, 2007

(30) Foreign Application Priority Data

Jun. 8, 2006  (DE) ....................... 10 2006 026 604

(51) Int. Cl.
*B60W 10/06* (2006.01)
*B60W 10/10* (2006.01)
(52) U.S. Cl. ...................... 477/143; 475/127
(58) Field of Classification Search ................. 477/127, 477/143; 475/127
See application file for complete search history.

(56) References Cited

U.S. PATENT DOCUMENTS

| | | | |
|---|---|---|---|
| 5,113,343 A | 5/1992 | Hunter et al. | |
| 6,508,742 B2 * | 1/2003 | Popp et al. | 477/155 |
| 6,577,939 B1 | 6/2003 | Keyse et al. | |
| 6,623,397 B1 * | 9/2003 | Raghavan et al. | 475/276 |
| 6,832,976 B2 | 12/2004 | Nishida et al. | |
| 2003/0220170 A1 | 11/2003 | Nishida et al. | |
| 2004/0053737 A1 * | 3/2004 | Lee et al. | 475/296 |
| 2005/0282680 A1 | 12/2005 | Soh | |
| 2006/0046892 A1 | 3/2006 | Bucknor et al. | |
| 2007/0129211 A1 | 6/2007 | Steinhauser et al. | |

FOREIGN PATENT DOCUMENTS

| | | |
|---|---|---|
| DE | 199 18 734 A1 | 11/2000 |
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |
| DE | 103 38 624 A1 | 11/2004 |
| DE | 103 30 153 A1 | 2/2005 |

(Continued)

*Primary Examiner*—Sherry L Estremsky
*Assistant Examiner*—Erin D Bishop
(74) *Attorney, Agent, or Firm*—Davis & Bujold, P.L.L.C.

(57) ABSTRACT

A method for operating a motor vehicle drivetrain with at least an automatic transmission and a drive motor. The automatic transmission includes at least five shifting elements to transmit torque and/or power. In each forward and reverse gear a maximum of two shifting elements are disengaged while the remaining shifting elements are engaged. Two consecutive gearshifts are carried out through selection of the five shifting elements. During a first gearshift, implemented as a multiple gearshift, a subsequent second gearshift, implemented as either a single or multiple gearshift, is prepared. During the first gearshift, a first shifting element is disengaged, a second shifting element is engaged, a third shifting element is prepared for disengagement in a subsequent second gearshift and a fourth shifting element is prepared for engagement. Further, during the first gearshift and the subsequent second gearshift, a fifth shifting element is retained in at least a substantially engaged state.

20 Claims, 2 Drawing Sheets

| | A | B | C | D | E |
|---|---|---|---|---|---|
| 1 | ● | ● | ● | | |
| 2 | ● | ● | | | ● |
| 3 | | ● | ● | | ● |
| 4 | | ● | | ● | ● |
| 5 | | ● | ● | ● | |
| 6 | | | ● | ● | ● |
| 7 | ● | | ● | ● | |
| 8 | ● | | | ● | ● |
| R | ● | ● | | ● | |

18

FOREIGN PATENT DOCUMENTS

| | | |
|---|---|---|
| DE | 103 61 288 A1 | 7/2005 |
| DE | 10 2004 001 380 A1 | 8/2005 |
| DE | 10 2004 010 269 A1 | 9/2005 |
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 868 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

* cited by examiner

METHOD FOR THE OPERATION OF A DRIVETRAIN

This application claims priority from German Application Serial No. 10 2006 026 604.8 filed Jun. 8, 2006.

FIELD OF THE INVENTION

The invention relates to a method for operating a motor vehicle drivetrain comprising at least one automatic transmission and one drive motor.

BACKGROUND OF THE INVENTION

The main components of a motor vehicle drivetrain are a drive motor and a transmission. A transmission converts torques and speeds and so transforms the traction force provided by the drive motor. The present invention concerns a method for the operation of a drivetrain which comprises at least a drive motor and an automatic transmission. In the context of the present invention, the term "automatic transmission" is understood to mean any transmission that effects automatic gear changes, these also being known as variable speed transmissions.

From DE 100 35 479 A1, a method for operating an automatic transmission is known in which successive upshifts and successive downshifts can be carried out with some overlap in order to improve the shift speed. For this, during each first upshift or downshift, a shift element needed for the subsequent second upshift or downshift is prepared, while the first upshift or downshift is in progress, in such manner that when a synchronization point is reached, namely a synchronous speed of the first upshift or downshift in progress, the subsequent second upshift or downshift can be carried out immediately.

In this way, according to DE 100 35 479 A1, single shifts are overlapped with one another, which means that each first upshift or downshift carried out and each subsequent second upshift or downshift is a single shift between two directly successive gears.

The method known from DE 100 35 479 A1 can be used for an automatic transmission with five shift elements of which, two shift elements are engaged for transmitting torque and/or transmitting power in one forward gear and one reverse gear and three shift elements are disengaged. Such an automatic transmission can be used to implement six forward gears. In the development of automatic transmissions, a trend toward an ever-greater number of gears, particularly for the forward gears of an automatic transmission, can be observed. Presently, for example, automatic transmissions with eight forward gears and one reverse gear are under development, wherein such automatic transmissions have at least five shift elements such that, for torque or force transfer at least five shift elements are disengaged in one forward gear and one reverse gear and the remaining shift elements are engaged. The method known from DE 100 35 479 A1 is not suited for such an automatic transmission.

Starting from this, the present invention addresses the problem of providing a new type of method for the operation of a drivetrain comprising at least an automatic transmission and a drive motor.

SUMMARY OF THE INVENTION

According to the first embodiment of the invention, in an automatic transmission with at least five shift elements of which, for torque or force transfer in any forward gear and in a reverse gear, no more than two shift elements are disengaged and the remaining shift elements are engaged. Two respective consecutive upshifts or two respective consecutive downshifts can be carried out by selecting at least five shift elements in that:

a) a first upshift or downshift is carried out as a multiple gearshift where, during the current first upshift or downshift, a single gearshift or a multiple gearshift is prepared as a subsequent second upshift or downshift;

b) when performing the first upshift or downshift as a multiple gearshift, a first shift element of the automatic transmission is opened and thus disengaged and a second shift element of the automatic transmission is closed and thus engaged;

c) while performing the first upshift or downshift as a multiple gearshift for the subsequent second upshift or downshift, a third shift element of the automatic transmission is prepared for opening and thus disengagement and a fourth shift element of the automatic transmission is prepared for closure and thus engagement;

d) while the first upshift or downshift is carried out and while the second upshift or downshift is carried out, at least a fifth shift element is maintained in the engaged or substantially engaged state.

According to a second embodiment of the invention, in an automatic transmission comprising at least five shift elements of which, for torque or force transfer in any forward gear and in a reverse gear, a maximum of two shift elements are disengaged and the remaining shift elements are engaged. A shift element that engages during the second upshift or downshift is prepared for engagement in a subsequent second upshift or downshift at a time while a first upshift or downshift is performed, which time precedes the point at which the synchronous point of the current first upshift or downshift is reached by a time-controlled or event-controlled applicable first period.

According to a third embodiment of the invention, in an automatic transmission with at least five shift elements of which, for torque or force transfer in any forward gear and a reverse gear, a maximum of two shift elements are disengaged and the remaining shift elements are engaged, while performing a first upshift or downshift and/or while performing a subsequent second upshift or downshift a torque of the drive motor is increased and/or reduced in relation to a torque for the drive motor derived from input provided by the driver in order to support the overlapped consecutive upshifts or downshifts.

These three embodiments, according to the invention outlined above, can be used for the operation of a drivetrain either alone or in a combination of two embodiments or in a combination of all three embodiments.

BRIEF DESCRIPTION OF THE DRAWINGS

The invention will now be described, by way of example, with reference to the accompanying drawings in which.

DETAILED DESCRIPTION OF THE INVENTION

Figures 1, 2, 3:
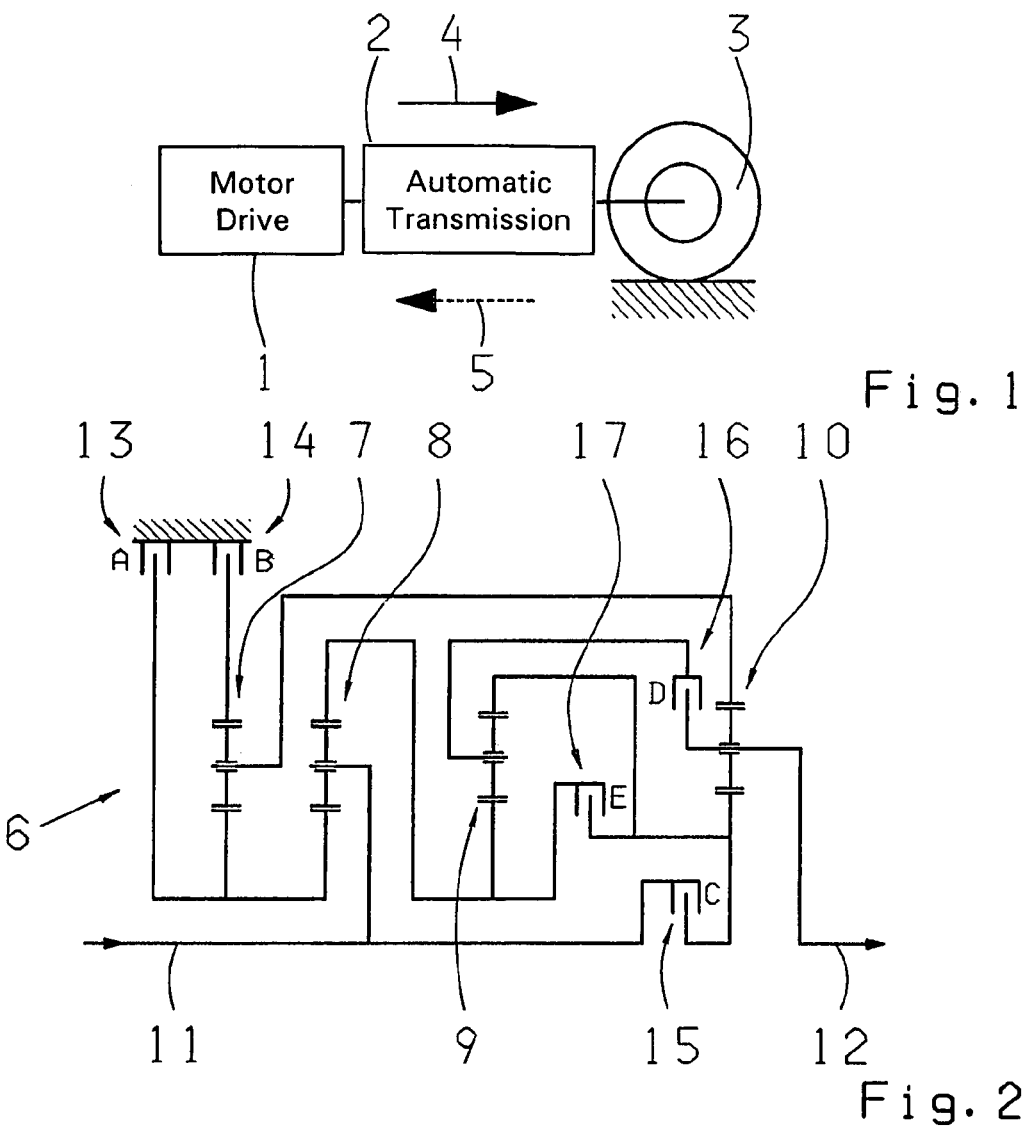
FIG. 1 is a drivetrain diagram of a motor vehicle.
FIG. 2 is a gearshift pattern of an automatic transmission of the drivetrain with five shift elements.
FIG. 3 is a shift element matrix for the shift elements of the gearshift pattern, according to FIG. 2, to illustrate which shift elements are engaged in what gear.

FIG. 1 is a schematic representation of a drivetrain of a motor vehicle, the drivetrain comprising a drive motor 1, an automatic transmission 2 and a drive wheel 3 of the motor vehicle. The automatic transmission 2 transfers the traction force produced by the drive motor 1 to the wheels 3 of the motor vehicle.

According to FIG. 1, when the drivetrain is operated in traction mode, power flows in the direction of arrow 4 from the drive motor 1 toward the wheels 3 of the motor vehicle. In contrast, if the drivetrain is operated in thrust mode, for example when braking or coasting, the power flow is in the direction of arrow 5, from the wheels 3 toward the drive motor 1.

The invention relates to a method for operating a drivetrain comprising the drive motor 1 and the automatic transmission 2, where the automatic transmission 2 has at least five shift elements and where, for torque or force transfer, a maximum of two shift elements in a forward gear, as well as in a reverse gear, are disengaged and the remaining shift elements are engaged. An example of such an automatic transmission is shown in FIGS. 2 and 3. While the invention is described more closely hereinafter based on this example, it is not limited in its use to this example of an automatic transmission.

FIG. 2 shows a gearshift pattern 6 of the automatic multi-ratio transmission 2, which has four transmission gearsets 7, 8, 9 and 10 in order to convert a transmission input torque present on a transmission input 11 to a transmission output torque on a transmission output 12.

The transmission gearsets 7, 8, 9 and 10 of the automatic transmission 2 are configured as planetary transmission gearsets according to FIG. 2. According to the gearshift pattern 6 from FIG. 2, in addition to the four transmission gearsets 7-10, the automatic transmission also comprises five shift elements 13, 14, 15, 16 and 17. Shift element 13 is also referred to as shift element A; shift element 14 as shift element B; shift element 15 as shift element C; shift element 16 as shift element D, and shift element 17 as shift element E. Shift element A and B are each brakes and shift elements C, D and E are clutches.

Figure 4:
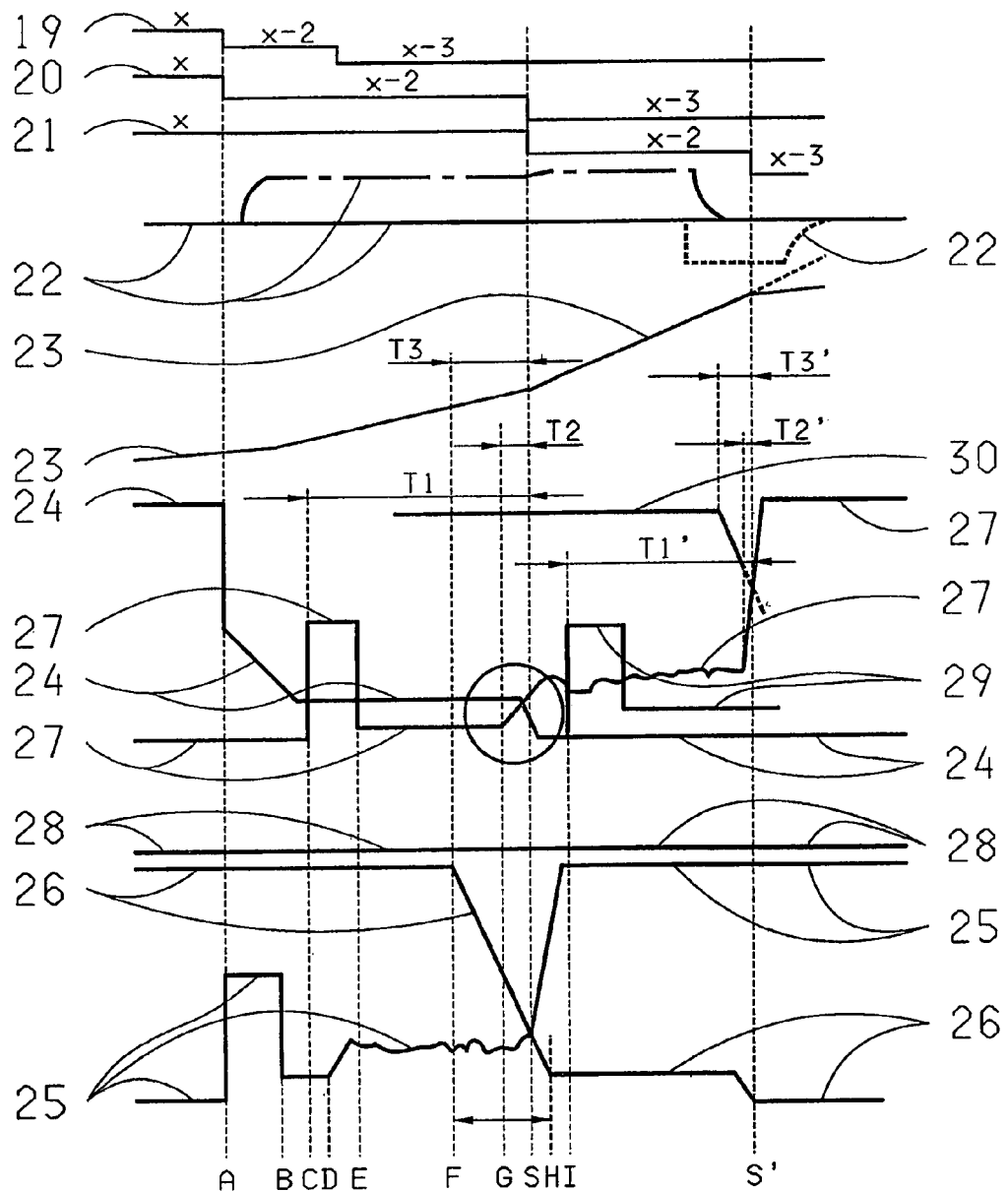
FIG. 4 is a diagram to illustrate the method according to the invention for operating a drivetrain of a motor vehicle, comprising an automatic transmission, according to FIGS. 2 and 3.

For the automatic transmission represented schematically in FIG. 2, comprising the five shift elements 13-17, eight forward gears, as well as one reverse gear, can be implemented using a shifting matrix 18, shown according to FIG. 4 where, in the left-hand column of the shifting matrix 18, the eight forward gears "1" to "8", as well as the reverse gear "R", have been entered and the shift elements A to E have been entered in the first line of the shifting matrix 18. Shift elements that are marked with a dot in the shift element matrix 18 are engaged in the respective gear. In each forward gear, as well as in the reverse gear, accordingly, three of the five shift elements are engaged for the transmission of power from the transmission input 11 to the transmission output 12. For example, shift elements A, B and C are engaged for forward gear "1" and shift elements A, B and D are engaged for the reverse gear "R". The remaining shift elements are disengaged in the respective gear.

To improve the shifting speed, successive upshifts or consecutive downshifts are carried out with some overlap, such that during a first upshift or downshift at least one shift element needed for the subsequent second upshift or downshift is prepared while the first upshift or downshift, specifically such that upon reaching a synchronous point of the current first upshift or downshift the subsequent second upshift or downshift can be carried out immediately.

The Table below shows the possible overlapped downshifts as well as the possible overlapped upshifts for the automatic transmission 2 according to FIGS. 2 and 3 in the left-hand column, where an additional downshift or upshift listed in parenthesis in the left-hand column behind a downshift or upshift means that the upshift or downshift not in parenthesis is the first downshift or upshift and the downshift or upshift in parenthesis is the second downshift or upshift for which the shift elements are prepared during the current first downshift or upshift.

|  | SHIFT ELEMENTS | | | | |
|---|---|---|---|---|---|
|  | A | B | C | D | E |
| DOWNSHIFT | | | | | |
| 8-6 (6-5) | d | pe | e | x | pd |
| 7-5 (5-4) | d | e | pd | x | pe |
| 5-3 (3-2) | pe | x | pd | d | e |
| 4-2 (2-1) | e | x | pe | d | pd |
| 8-4 (4-3) | d | e | pe | pd | x |
| 8-2 (2-1) | x | e | pe | d | pd |
| 6-3 (3-2) | pe | e | pd | d | x |
| 7-5 (5-3) | d | e | x | pd | pe |
| 6-4 (4-2) | pe | e | d | pd | x |
| UPSHIFT | | | | | |
| 1-3 (3-4) | d | x | pd | pe | e |
| 2-4 (4-5) | d | x | pe | e | pd |
| 4-6 (6-7) | pe | d | e | x | pd |
| 5-7 (7-8) | e | d | pd | x | pe |

In the Table, shift elements that are closed and thus engaged during a first upshift or downshift to be performed have been marked with "e". However, shift elements that are opened and thus disengaged during a first upshift or downshift have been marked with "d" in the above Table. Shift elements that during a first upshift or downshift are prepared for closure and thus engagement or for opening and thus disengagement in a subsequent second upshift or downshift have been marked with "pe" or "pd" in the above Table. Shift elements marked with "x" are and remain engaged during an upshift or downshift.

When using the above Table for the automatic transmission, according to FIGS. 2 and 3, multiple gearshifts are performed as a function of a gearshift change to be performed from an actual gear to a target gear, both as first upshifts and as first downshifts. While a multiple gearshift is carried out as a first upshift or downshift, a second subsequent upshift or downshift is prepared as either a single or multiple gearshift.

First multiple downshifts, according to the Table above, are double downshifts or triple downshifts or quadruple downshifts or even sextuple downshifts. Optionally, subsequent second multiple downshifts are double downshifts.

A first multiple upshift is always a double upshift. A single upshift can be prepared as a second subsequent upshift during a first multiple upshift performed as a double upshift.

According to the first embodiment of the present invention, a first shift element is opened and thus disengaged and a second shift element is closed and thus engaged when carrying out a first upshift or downshift as a multiple shift. While the first upshift or downshift is carried out as a multiple gearshift, a third shift element is prepared for opening and thus disengagement and a fourth element for closure and thus engagement for the subsequent second upshift or downshift, which is prepared as a single gearshift or multiple gearshift and is optionally carried out. While the first upshift or downshift is carried out and while the second upshift or downshift is carried out, at least a fifth shift element is maintained in the engaged or substantially engaged state.

This first embodiment of the present invention is described with reference to FIG. 4 based on the example of two consecutive downshifts. The first downshift is carried out as a multiple gearshift, namely as a double gearshift. The second downshift is being prepared as a single shift while the first downshift is carried out. According to the Table above, the overlapped downshifts can be, for example, 7-5 (5-4) or also 4-2 (2-1).

FIG. 4 shows the courses of different signals over time, where signal line 19 represents a desired gear as a function of input provided by the driver; wherein signal line 20 represents a target gear determined on the basis of the desired gear; where signal line 21 represents an actual gear; where signal line 22 represents the torque of the drive motor 1 of the drivetrain, and signal line 23 represents a rotational speed of the drive motor 1.

Signal lines 24, 25, 26, 27 and 28 represent the selection and/or the behavior over time of five shift elements conducting two consecutive downshifts in an overlapped manner, where the signal line 24 represents the behavior over time of a first shift element to be opened and thus disengaged in the first downshift; where the signal line 25 represents the behavior over time of the second shift element to be closed and thus engaged in the first downshift; where the signal line 26 represents the behavior over time of the third shift element prepared during the first downshift for opening and thus disengagement in the subsequent second downshift, and where signal line 27 represents the behavior over time of the fourth shift element during the first downshift for closure and thus engagement in a subsequent second downshift. Signal line 28 represents the behavior, over time, of a fifth shift element, which is maintained in the engaged or substantially engaged state while the first upshift or downshift is performed and while the second upshift or downshift is performed.

At the time A, a change of the desired gear (see signal line 19) and, derived from that, a change of the target gear (see signal line 20) by way of a desired multiple downshift by two gears (x-2), exists where this triggers the overlapped implementation or preparation of consecutive downshifts, specifically such that at the time A, on one hand, the first shift element (see signal line 24) to be opened and thus disengaged in the first downshift starts with the shifting phase and that, on the other hand, the second shift element (see signal line 25) to be closed and thus engaged in the first downshift is subjected to a rapid filling process, where the rapid filling takes place between times A and B.

The third shift element (see signal line 26), which is to be prepared during the first downshift, which is a multiple gearshift, for the subsequent second downshift, which is a single gearshift, as well as the fourth shift element (see signal line 27) are set to a defined state at time A. The fifth shift element (see signal line 28) is kept engaged.

After completing the rapid filling step of the second shift element (see signal line 25) to be closed and thus engaged in the first downshift, the second shift element transitions from the rapid filling phase to a filling equalization phase, where the filling equalization phase extends between times B and D. The rapid filling phase between times A and B and the filling equalization phase between times B and D, together define the filling phase of the second shift element that is to engage during the first downshift. At time D, the second shift element (see signal line 25) to be closed and thus engaged in the first downshift is transferred from the filling phase to the shifting phase.

While the first downshift is carried out as a multiple gearshift during which the first shift element, according to signal line 24, is opened and thus disengaged and the second shift element, according to signal line 25, is closed and thus engaged. Two shift elements are prepared for a possible following second downshift which, in the example, is to be performed as a single gearshift.

At time C, therefore, the fourth shift element (see signal line 27) to be closed and thus engaged in possibly a following second downshift is prepared with a rapid filling phase, which extends between times C and E.

With the completion of the rapid filling phase of the fourth shift element at time E, this element switches to a filling equalization phase which, according to FIG. 4, lasts until time G. At time G, the fourth shift element prepared for engagement switches from the filling phase to the shifting phase.

Likewise, while the first downshift is being performed, the third shift element (see signal line 26) is prepared for opening and disengagement in a subsequent second downshift. At time F, a transition phase of the third and hence disengaging shift element preparing for the subsequent second downshift is started where, at time S which corresponds to a synchronous point of the first downshift, a change occurs from the first downshift to the subsequent second downshift.

Upon reaching time S, the shift elements that were being prepared during the first downshift become the active shift elements of the subsequent second downshift. Thus at time G, the fourth shift element, which was prepared for closure and thus engagement during the first downshift, becomes the engaging shift element of the second downshift. The first shift element, which was disengaged and thus opened during the first downshift, is therefore disconnected. Starting at time H, the third shift element, which was being prepared for opening and thus disengagement, reaches the disengagement pressure level.

The fifth shift element (see signal line 28) is kept engaged or substantially engaged while the first downshift is performed and while the second downshift is performed.

During the subsequent second downshift, shift elements are prepared for possibly a following third downshift, which is, in turn, a single downshift (see signal lines 29 and 30).

According to the second embodiment of the present invention, the fourth shift element (see signal line 27) to be engaged during the second downshift is prepared for engagement in the second downshift at the time C, while the first downshift is being performed, with a rapid filling phase, which time precedes the point at which the synchronous point of the current first downshift at time S is reached by a time-controlled or event-controlled applicable first time period $T_1$. The time-controlled or event-controlled applicable first time period $T_1$ can be implemented, for example, by a time reserve or a speed differential, relative to synchronous point S of the first downshift.

When time C resulting from synchronous point S and the applicable first time period $T_1$, as FIG. 4 shows, follows the end of the rapid filling phase of the second shift element (see signal line 25) to be engaged in the first downshift, meaning after time B, the preparations of the fourth shift element (see signal line 27) to be engaged in the second downshift are started promptly.

On the other hand, if the time C, resulting from the synchronous point S of the current first downshift and from the applicable first time period $T_1$, should precede the end (time B) of the rapid filling phase of the second shift element to be engaged in the first downshift, the preparation of the fourth shift element is delayed until the rapid filling phase of the second shift element to be engaged in the first downshift has been completed.

As mentioned above, the fourth shift element (see signal line 27) prepared for engagement in the second downshift while the first downshift is being performed is switched from the preparation phase to the shifting phase at time G.

This time G precedes the synchronous point S of the first downshift by a time-controlled or event-controlled applicable second time period $T_2$. As FIG. 4 shows, when time G, resulting from the synchronous point S of the first downshift and the applicable second time period $T_2$, follows the end of the rapid filling phase (time E) of the fourth shift element to be engaged in the second downshift, the fourth shift element to be engaged in the second downshift is switched directly from the preparation phase to the shifting phase.

On the other hand, if time G, resulting from the synchronous point S of the current first downshift and the applicable second time period $T_2$, should precede the end of the rapid filling phase (time E) of the fourth shift element to be engaged in the second downshift, the transition of the fourth shift element from the preparation phase to the shifting phase is delayed until the rapid filling phase of the fourth shift element has been completed.

As mentioned above, the third shift element, which is prepared for opening and thus disengagement in the subsequent second downshift while the first downshift is being carried out, is shifted from the preparation phase to the shifting phase at time F, where time F precedes the time at which the synchronous point S of the first downshift is reached by a time-controlled or event-controlled applicable third time period $T_3$.

At time F, a decision is made in the illustrated embodiment as to whether the second downshift prepared during the first downshift is, in fact, implemented.

In this way, a prepared subsequent shift is carried out only if this corresponds to the input provided by the driver. As FIG. 4 shows, at time F, according to the signal line 19 representing the driver's input, a further downshift (x-3) is requested for the desired gear so that the second downshift is then, in fact, implemented in the example according to FIG. 4.

As explained above, during the second downshift, the corresponding shift elements, according to signal lines 29 and 30, are prepared for a third subsequent downshift where, in FIG. 4, for the third downshift to be prepared during the second downshift, the corresponding applicable first time period $T'_1$, second time period $T'_2$ and third time period $T'_3$ relate to a synchronous point S' of the second downshift. The third downshift that is prepared, while the second downshift is being performed, is a single downshift.

FIG. 4 illustrates that at a time, defined by the synchronous point S' of the second downshift and the applicable third time period $T'_3$, no further downshift is desired for the desired gear based on the signal line 19 representing the driver's input so that the third downshift prepared during the second downshift is not carried out, but instead is aborted.

As FIG. 4 shows, according to the signal line 21, the actual gear is set to a new value as the synchronous point S or S' of an implemented gearshift is detected, while the target gear, according to the signal line 20, changes to the next gear or remains unchanged as a function of the desired gear, according to signal line 19.

According to a third embodiment of the present invention, for the exemplary embodiment shown according to FIG. 4, torque of the drive motor is increased or reduced in relation to the torque of the drive motor derived from input provided by the driver, while the first downshift is performed and while the second downshift is performed, in order to support the overlapped implementation of the consecutive downshifts. For example, signal line 22, shown as a solid line according to FIG. 4, corresponds to torque of the drive motor derived from input provided by the driver. According to a first variation, shown with a dash-dotted line according to FIG. 4, the torque of the drive motor is increased in relation to the torque for the drive motor derived from the driver's input while the first downshift is carried out as well as while the second downshift is carried out. According to a second variation shown with a dotted line according to FIG. 4, the torque of the drive motor is reduced in relation to the torque for the drive motor derived from the driver's input toward the end of the second downshift. Both variants will be addressed in detail hereinafter.

The excess increase of the torque of the drive motor in relation to the torque of the drive motor derived from the driver's input which increase is illustrated with a dash-dotted line in FIG. 4, is carried out when the drivetrain is operated either in a trailing throttle operation or in a partial load traction mode. During each downshift that is carried out, both in the trailing throttle operation and in the partial load traction mode, a torque increase of the drive motor, in relation to the torque derived from the driver's input, is carried out, while a verification step is performed during each downshift to ensure that a prepared subsequent downshift corresponds to the driver's input. This occurs at a time that depends on the synchronous point S and on the applicable third time period $T_3$, meaning in the exemplary embodiment according to FIG. 4 at time F.

At that time, based on the driver's input, when a subsequent downshift is requested, a shift from the torque increase of the first downshift to the torque increase of the second downshift is carried out where, in the illustrated example, the torque increase of the second downshift is greater than the torque increase of the first downshift. Unlike in this example, it is also possible that the torque increase of the second downshift is smaller than the torque increase of the first downshift. Likewise, both torque increases can be equal. It is preferable if a ramp-like transition is carried out between the two torque increases.

At the time referred to above, which time is defined by the synchronous point S and the applicable third time period $T_3$, based on the driver's input, if a subsequent downshift is not desired, the prepared subsequent downshift is aborted and the torque increase for the drive motor is terminated to end the shifting process. This is illustrated, according to FIG. 4, for the third downshift that is under preparation during the second downshift.

In the execution, as well as the preparation of consecutive downshifts in a traction mode of the drivetrain, during each downshift that is performed, in turn, a verification is performed again at a time-controlled or event-controlled applicable time, namely, at the time dependent on the synchronous point S and the applicable third time period $T_3$, as to whether a prepared subsequent gearshift corresponds to the driver's input. If this is not the case, as is illustrated according to FIG. 4, for the third downshift that is under preparation during the second downshift, the prepared subsequent downshift is aborted and, in order to end the shifting process in the traction mode, the torque reduction for the drive motor, which is shown with a dotted signal line 22 according to FIG. 4, is performed in relation to the torque derived from the driver's input.

At this time, however, if a subsequent downshift is desired, as is the case according to FIG. 4, for the second downshift that is under preparation during the first downshift, the torque reduction of the drive motor is not carried out. The torque reduction during downshifts is consequently implemented only when a shifting process is supposed to be ended, meaning no subsequent gearshift follows. Furthermore, the torque reduction, referred to above, is carried out only in traction mode, both with a wide-open throttle and in partial load. In the trailing throttle operation, however, this torque reduction is not implemented with downshifts.

In the exemplary embodiment according to FIG. 4, two consecutive downshifts can be implemented as overlapped gearshifts by selecting five shift elements where, according to FIG. 4, for the implementation of the first downshift as a multiple gearshift, a first shift element (signal line 24) is opened and thus disengaged and a second shift element (signal line 25) is closed and thus engaged. While the first downshift is carried out, the third shift element (signal line 26) is prepared for opening and thus disengagement in the subsequent second downshift, and the fourth shift element (signal line 27) is prepared for closure and thus engagement. The fifth shift element (signal line 28) is kept engaged or substantially engaged while the first downshift is performed and while the second downshift is performed.

The procedure for overlapped downshifts, according to the invention according to FIG. 4, can be translated in an equivalent fashion to overlapped upshifts. In the implementation of consecutive upshifts, the only difference as compared with the implementation of consecutive downshifts, according to FIG. 4, exists with respect to the third aspect of the present invention, which relates to the increase or decrease of the torque of the drive motor in relation to the torque for the drive motor derived from the driver's input.

For consecutive upshifts in a trailing throttle operation of the drivetrain, a torque increase is carried out for both upshifts while, in the traction mode, a torque reduction is carried out in both upshifts. A torque reduction for ending the shifting process does not occur with consecutive upshifts.

The method according to the invention, can be used with all automatic transmissions comprising at least five shift elements and where, for torque transmission and/or power transmission purposes, a maximum of two of these at least five shift elements are disengaged and the remaining shift elements are engaged.

REFERENCE NUMERALS

| | |
|---|---|
| 1 | drive motor |
| 2 | automatic transmission |
| 3 | wheel |
| 4 | arrow |
| 5 | arrow |
| 6 | transmission layout |
| 7 | transmission gearset |
| 8 | transmission gearset |
| 9 | transmission gearset |
| 10 | transmission gearset |
| 11 | transmission input |
| 12 | transmission output |
| 13 | shift element A |
| 14 | shift element B |
| 15 | shift element C |
| 16 | shift element D |
| 17 | shift element E |
| 18 | shift element matrix |
| 19 | signal line |
| 20 | signal line |
| 21 | signal line |
| 22 | signal line |
| 23 | signal line |
| 24 | signal line |
| 25 | signal line |
| 26 | signal line |
| 27 | signal line |
| 28 | signal line |
| 29 | signal line |
| 30 | signal line |

The invention claimed is:

1. A method of operating of a drivetrain of a motor vehicle having at least a drive motor and an automatic transmission with at least five shift elements, the method improving a shift speed of at least one of a successive upshift and a successive downshift, such that during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:

requiring, at most, two of the at least five shift elements to be disengaged and a remainder of the at least five shift elements to be engaged, in each of a plurality of forward and reverse gears, for transferring torque and force, and two respective consecutive upshifts or two respective consecutive downshifts are accomplished with at least some overlap;

defining the first upshift and the first downshift as a multiple gearshift;

preparing the successive upshift or the successive downshift during the first upshift or the first downshift, the successive upshift or the successive downshift being one of a single gearshift or a multiple gearshift;

disengaging a first of the at least five shift elements and engaging a second of the at least five shift elements during the first upshift or the first downshift;

preparing a third of the at least five shift elements, during the first upshift or the first downshift, for disengagement in the successive upshift or the successive downshift;

preparing a fourth of the at least five shift elements, during the first upshift or the first downshift, for engagement in the successive upshift or the successive downshift;

at least partially retaining at least a fifth of the at least five shift elements during the first upshift or the first downshift and during the successive upshift or the successive downshift; and one of increasing and decreasing a torque of the drive motor, relative to a torque of the drive motor derived from a driver's wish, during at least one of the first upshift or the first downshift and the successive upshift or the successive downshift to assist in overlapped implementation of the successive upshift or the successive downshift.

2. The method according to claim 1, further comprising the step of preparing the at least one shift element for a subsequent upshift or a subsequent downshift, during a previous upshift or a previous downshift, the subsequent upshift or the subsequent downshift only being performed if the subsequent upshift or the subsequent downshift corresponds to input provided by a driver at one of a time-controlled applicable time and an event-controlled applicable time.

3. The method according to claim 1, further comprising the step of preparing for engagement, during the first upshift or the first downshift, the at least one shift element required for the successive upshift or the successive downshift, at a time which precedes the synchronous point of the first upshift or the first downshift by one of a time-controlled and an event-controlled applicable first time period.

4. The method according to claim 3, further comprising the step of changing the at least one shift element, prepared to be engaged during the successive upshift or the successive downshift, from a preparation phase to a shift phase at a time before reaching the synchronization point of the first upshift or the first downshift, by a second time interval applied in another time-controlled manner or another event-controlled manner.

5. The method according to claim 4, further comprising the step of delaying the step of changing the at least one shift element, prepared to be engaged during the successive upshift or the successive downshift, from the preparation phase to the shift phase, until the rapid filling phase of the at least one shift element to be engaged during the successive upshift or the successive downshift has been completed, if the time before reaching the synchronization point of the first upshift or the first downshift and the second time interval occurs before the end of a rapid filling phase of the at least one shift element to be engaged during the successive upshift or the successive downshift; or immediately changing the at least one shift element to be engaged during the successive upshift or the successive downshift from the preparation phase to the shift phase.

6. The method according to claim 3, further comprising the step of delaying the preparation of the at least one shift element to be engaged during the successive upshift or the successive downshift, until a rapid filling phase of a first shift element to be engaged during the first upshift or the first downshift has been completed, if a time, determined from the synchronization point of the first upshift or the first downshift in progress and the first time period, occurs before the end of the rapid filling phase of the first shift element to be engaged during the first upshift or the first downshift; and immediately beginning preparation of the at least one shift element to be engaged during the successive upshift or the successive downshift.

7. The method according to claim 3, further comprising the steps of preparing the at least one shift element disengaging in the successive upshift or the successive downshift while the first upshift or downshift is carried out, for disengaging during the successive upshift or the successive downshift at the beginning of the first upshift or downshift, and switching the at least one shift element prepared for disengaging in the successive upshift or the successive downshift from a preparation phase to a shifting phase at the time that precedes the synchronous point of the first upshift or the first downshift by a time-controlled or event-controlled applicable third time period.

8. The method according to claim 1, further comprising the step of checking, during each downshift carried out and at a time, applicable in a time-controlled manner or an event-controlled manner, whether a prepared follow-up shift, corresponds with a driver's wish to carry out further successive downshifts during traction operation of the drivetrain, if no follow-up shift is desired, the prepared follow-up shift is discontinued and the torque of the drive motor torque is reduced relative to the torque of the drive motor derived from the driver's wish, but if a follow-up shift is desired, on the basis of the driver's wish, the prepared follow-up shift is carried out and the torque of the drive motor is not reduced.

9. The method according to claim 1, further comprising the step of increasing the torque of the drive motor relative to torque of the drive motor, derived from the driver's wish, during each downshift carried out and also checking, during each downshift carried out and at the time applicable in a time-controlled manner or an event-controlled manner, whether a prepared follow-up shift corresponds to the driver's wish, to carry out a follow-up downshifts when the drivetrain is in a thrust operation or a part-load traction operation, if the follow-up downshift is desired, a ramp-like transition, is implemented between torque levels of the follow-up downshifts, but if the follow-up shift is not desired, the prepared follow-up shift is discontinued and the torque of the drive motor is discontinued to prevent the follow-up downshift.

10. The method according to claim 1, further comprising the steps of reducing the torque of the drive motor relative to the torque derived from the driver's wish, during traction operation of the drivetrain to carry out the successive upshifts; and increasing the torque of the drive motor relative to the torque derived from the driver's wish, during each of the successive upshifts carried out to carry out the successive upshifts during thrust operation of the drivetrain.

11. A method of operating a drivetrain of a motor vehicle having at least a drive motor and an automatic transmission with only five shift elements, the method improving a shift speed of at least one of a successive upshift and a successive downshift, such that during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:
  requiring, at most, two of the five shift elements to be disengaged and a remainder of the five shift elements to be engaged, in each of a plurality of forward and reverse gears, for transferring torque and force, and two respective consecutive upshifts or two respective consecutive downshifts are accomplished with at least some overlap;
  defining the first upshift and the first downshift as a multiple gearshift;
  preparing the successive upshift or the successive downshift during the first upshift or the first downshift, the successive upshift or the successive downshift being one of a single gearshift or a multiple gearshift;
  disengaging a first of the five shift elements and engaging a second of the five shift elements during the first upshift or the first downshift;
  preparing a third of the five shift elements, during the first upshift or the first downshift, for disengagement in the successive upshift or the successive downshift;
  preparing a fourth of the five shift elements, during the first upshift or the first downshift, for engagement in the successive upshift or the successive downshift; and
  at least partially retaining at least a fifth of the five shift elements during the first upshift or the first downshift and during the successive upshift or the successive downshift.

12. The method according to claim 11, further comprising the step of preparing the at least one shift element for a subsequent upshift or a subsequent downshift, during a previous upshift or a previous downshift, the subsequent upshift or the subsequent downshift only being performed if the subsequent upshift or the subsequent downshift corresponds to input provided by a driver at one of a time-controlled applicable time and an event-controlled applicable time.

13. The method according to claim 11, further comprising the step of preparing for engagement, during the first upshift or the first downshift, the at least one shift element required for the successive upshift or the successive downshift, at a time which precedes the synchronous point of the first upshift or the first downshift by one of a time-controlled and an event-controlled applicable first time period.

14. The method according to claim 13, further comprising the step of changing the at least one shift element, prepared to be engaged during the successive upshift or the successive downshift, from a preparation phase to a shift phase at a time before reaching the synchronization point of the first upshift or the first downshift, by a second time interval applied in another time-controlled manner or another event-controlled manner.

15. The method according to claim 14, further comprising the step of delaying the step of changing the at least one shift element, prepared to be engaged during the successive upshift or the successive downshift, from the preparation phase to the shift phase, until the rapid filling phase of the at least one shift element to be engaged during the successive upshift or the successive downshift has been completed, if the time before reaching the synchronization point of the first upshift or the first downshift and the second time interval occurs before the end of a rapid filling phase of the at least one shift element to be engaged during the successive upshift or the successive downshift; or immediately changing the at least one shift element to be engaged during the successive upshift or the successive downshift from the preparation phase to the shift phase.

16. The method according to claim 13, further comprising the step of delaying the preparation of the at least one shift element to be engaged during the successive upshift or the successive downshift, until a rapid filling phase of a first shift element to be engaged during the first upshift or the first downshift has been completed, if a time, determined from the synchronization point of the first upshift or the first downshift in progress and the first time period, occurs before the end of the rapid filling phase of the first shift element to be engaged during the first upshift or the first downshift; and immediately beginning preparation of the at least one shift element to be engaged during the successive upshift or the successive downshift.

17. The method according to claim 13, further comprising the steps of preparing the at least one shift element disengaging in the successive upshift or the successive downshift while the first upshift or downshift is carried out, for disengaging during the successive upshift or the successive downshift at the beginning of the first upshift or downshift, and switching the at least one shift element prepared for disengaging in the successive upshift or the successive downshift from a preparation phase to a shifting phase at the time that precedes the synchronous point of the first upshift or the first downshift by a time-controlled or event-controlled applicable third time period.

18. The method according to claim 11, further comprising the steps of
requiring disengagement of, at most, two of the five shift elements and engagement of a remainder of the five shift elements, in each of a plurality of forward and reverse gears for transferring torque and force; and
one of increasing and decreasing a torque of the drive motor, relative to a torque of the drive motor derived from a driver's wish, during at least one of the first upshift or the first downshift and the successive upshift or the successive downshift, to assist in overlapped implementation of the successive upshift or the successive downshift.

19. The method according to claim 18, further comprising the step of checking, during each downshift carried out and at a time, applicable in a time-controlled manner or an event-controlled manner, whether a prepared follow-up shift, corresponds with a driver's wish to carry out further successive downshifts during traction operation of the drivetrain, if no follow-up shift is desired, the prepared follow-up shift is discontinued and the torque of the drive motor torque is reduced relative to the torque of the drive motor derived from the driver's wish, but if a follow-up shift is desired, on the basis of the driver's wish, the prepared follow-up shift is carried out and the torque of the drive motor is not reduced.

20. The method according to claim 18, further comprising the step of increasing the torque of the drive motor relative to torque of the drive motor, derived from the driver's wish, during each downshift carried out and also checking, during each downshift carried out and at the time applicable in a time-controlled manner or an event-controlled manner, whether a prepared follow-up shift corresponds to the driver's wish, to carry out a follow-up downshifts when the drivetrain is in a thrust operation or a part-load traction operation, if the follow-up downshift is desired, a ramp-like transition, is implemented between torque levels of the follow-up downshifts, but if the follow-up shift is not desired, the prepared follow-up shift is discontinued and the torque of the drive motor is discontinued to prevent the follow-up downshift.

* * * * *